(12) United States Patent
Wang

(10) Patent No.: US 10,851,760 B2
(45) Date of Patent: Dec. 1, 2020

(54) LIQUID POTENTIAL ENERGY INCREASING DEVICE

(71) Applicant: Yun-Huei Wang, Taipei (TW)

(72) Inventor: Yun-Huei Wang, Taipei (TW)

( * ) Notice: Subject to any disclaimer, the term of this patent is extended or adjusted under 35 U.S.C. 154(b) by 30 days.

(21) Appl. No.: 16/137,387

(22) Filed: Sep. 20, 2018

(65) Prior Publication Data

US 2019/0353140 A1    Nov. 21, 2019

(30) Foreign Application Priority Data

May 21, 2018    (TW) .............................. 107117171 A

(51) Int. Cl.
  *F03B 17/00*    (2006.01)
  *F03G 7/10*    (2006.01)

(52) U.S. Cl.
  CPC ................ *F03B 17/00* (2013.01); *F03G 7/10* (2013.01)

(58) Field of Classification Search
  CPC ...... F03B 13/06; F03B 13/264; F03B 17/063; F03B 13/12; F03B 13/26; F03B 13/16; F03B 17/00; F05B 2240/93; F05B 2260/4031; F05B 2220/706; F03G 7/10
  See application file for complete search history.

(56) References Cited

U.S. PATENT DOCUMENTS

| 8,946,920 B2 * | 2/2015 | Phillips .................... F03B 13/16 290/53 |
| 2016/0160844 A1* | 6/2016 | Saavedra ................. F03B 13/22 60/414 |
| 2016/0343494 A1* | 11/2016 | Fullerton ............... H01F 7/0247 |
| 2017/0132246 A1* | 5/2017 | Pudipeddi ........... G06F 16/1794 |

* cited by examiner

*Primary Examiner* — Shafiq Mian
(74) *Attorney, Agent, or Firm* — Kirton McConkie; Evan R. Witt

(57) ABSTRACT

A liquid potential energy increasing device includes a first receiving trough, a second receiving trough, a liquid absorbing structure, a first magnetic component, and a second magnetic component. The liquid absorbing structure includes a main body portion and an extending portion. The extending portion conveys a liquid in the first receiving trough into the main body portion. When a sum of a weight of the main body portion and a weight of the liquid in the main body portion is greater than the magnetic attraction, the main body portion hits the second receiving trough by gravity, so that the liquid in the main body portion is at least partially released to the second receiving trough so as to increase potential energy of the liquid.

8 Claims, 12 Drawing Sheets

LIQUID POTENTIAL ENERGY INCREASING DEVICE

BACKGROUND

Technical Field

The invention relates to a liquid energy increasing device. More particularly, the invention relates to a device capable of increasing liquid's potential energy.

Description of Related Art

Conventional energy generation methods usually involve a significant consumption of environmental costs. The primary energy generation method is coal-burning; nevertheless, such way of energy generation often leads to serious air pollution. In addition, energy generates by other means such as nuclear power causing nuclear pollution, as well as tons of nuclear waste, and even public safety crisis of radiation leakage. Therefore, the generation of power by way of renewable energy sources is an inevitable trend. Furthermore, in the case of renewable energy such as solar or wind power production dependent upon Mother Nature, as electricity has to be generated by way of the capture of energy of radiant light from the sun or the capture of energy of wind wave, energy production cannot be implemented in an indoor environment, whilst is vulnerable to weather condition and geographical influences.

SUMMARY

The invention provides a liquid potential energy increasing device which generates power in the form of renewable energy.

In an embodiment of the invention, a liquid potential energy increasing device includes at least one potential energy increasing unit, and the at least one potential energy increasing unit includes a first receiving trough, a second receiving trough, a liquid absorbing structure, a first magnetic component, and a second magnetic component. The first receiving trough may receive a liquid. The second receiving trough is disposed above the first receiving trough. The liquid absorbing structure includes a main body portion and an extending portion. The main body portion is located in the second receiving trough, and the extending portion is connected to the main body portion and extends to the first receiving trough. The first magnetic component and the second magnetic component are respectively disposed on the second receiving trough and the main body portion. The main body portion is positioned at a first position on the second receiving trough by a magnetic attraction between the first magnetic component and the second magnetic component. The extending portion is adapted to convey the liquid in the first receiving trough into the main body portion. When a sum of a weight of the main body portion and a weight of the liquid being conveyed to the main body portion is greater than the magnetic attraction, the main body portion moves from the first position to a second position on the second receiving trough by gravity and hits the second receiving trough, so that the liquid in the main body portion is at least partially released into the second receiving trough.

In an embodiment of the invention, when the liquid in the main body portion is at least partially released into the second receiving trough so that the sum of the weight of the main body portion and the weight of the liquid in the main body portion is less than the magnetic attraction, the main body portion is returned to the first position by the magnetic attraction.

In an embodiment of the invention, a number of the at least one potential energy increasing unit of the liquid potential energy increasing device is plural. The second receiving trough of at least one of the potential energy increasing units and the first receiving trough of another one of the potential energy increasing units are located at a same height and in communication with each other.

In an embodiment of the invention, the liquid potential energy increasing device includes a supporting structure. The supporting structure and the first receiving trough of one of the potential energy increasing units are located at a same height, and the first receiving trough of another one of the potential energy increasing units is supported on the supporting structure.

In an embodiment of the invention, the extending portion of the at least one potential energy increasing unit and the extending portion of another one of the potential energy increasing units are respectively located at two opposite sides of the liquid potential energy increasing device.

In an embodiment of the invention, a number of the at least one potential energy increasing unit of the liquid potential energy increasing device is plural. The potential energy increasing units are connected to one another in a horizontal direction. The first receiving trough of each of the potential energy increasing units and the first receiving trough of another one of the potential energy increasing units are located at a same height and in communication with each other. The second receiving trough of each of the potential energy increasing units and the second receiving trough of another one of the potential energy increasing units are located at a same height and in communication with each other.

In an embodiment of the invention, the second receiving trough of the liquid potential energy increasing device includes a trough body and a rack body. The trough body may receive the liquid. The rack body is disposed on the trough body and has a top wall, and the first magnetic component is disposed on the top wall.

In an embodiment of the invention, the main body portion of the liquid potential energy increasing device includes a liquid absorbing component, a plate, and a frame. The extending portion is connected to the liquid absorbing component. A periphery of the liquid absorbing component is sandwiched between the plate and the frame. The liquid absorbing component protrudes from the frame, and the second magnetic component is disposed on the plate.

In an embodiment of the invention, a partial segment of the extending portion of the liquid potential energy increasing device is sandwiched between the plate and the liquid absorbing component.

In an embodiment of the invention, the extending portion and the liquid absorbing component of the liquid potential energy increasing device are sponges.

In an embodiment of the invention, the extending portion and the liquid absorbing component of the liquid potential energy increasing device are integrally formed.

In an embodiment of the invention, the first magnetic component and the second magnetic component of the liquid potential energy increasing device are magnets.

In an embodiment of the invention, the second receiving trough of the liquid potential energy increasing device includes a trough body and an impact plate. The impact plate is disposed inside the trough body and is located at the second position, the main body portion is adapted to hit the impact plate, and the liquid on the impact plate is adapted to be released into the trough body.

In an embodiment of the invention, the impact plate of the liquid potential energy increasing device has at least one opening, and the liquid on the impact plate is adapted to be released into the trough body through the opening.

In an embodiment of the invention, one of the main body portion and the impact plate of the liquid potential energy increasing device has at least one recess. The other one of the main body portion and the impact plate has at least one protrusion. The protrusion and the recess are adapted to collide with each other.

In an embodiment of the invention, the impact plate of the liquid potential energy increasing device includes a plurality of capillaries.

In an embodiment of the invention, the liquid potential energy increasing device includes a float. The float is disposed inside the first receiving trough and partially extends outside the first receiving trough.

In an embodiment of the invention, the first receiving trough of the liquid potential energy increasing device includes a trough body. The trough body is adapted to receive the liquid. The extending portion of the liquid absorbing structure is located at a first region of the trough body, and the first receiving trough has at least one protruding portion located at a second region of the trough body.

To sum up, in the liquid potential energy increasing device provided by the embodiments of the invention, the liquid located in the first receiving trough is delivered upwards to the main body portion in the second receiving trough through the extending portion of the liquid absorbing structure. In this way, after the main body portion absorbs the liquid, the main body portion is heavy enough to move by gravity against the magnetic attraction of the magnetic components and hits the second receiving trough, so that the liquid in the main body portion is partially released into the second receiving trough. Next, the main body portion is reduced in weight due to release of liquid therefrom; thus the main body portion is returned by the magnetic attraction. As described above, without using any force or energy provided by external resources, the liquid in the first receiving trough may be continuously conveyed to the second receiving trough located at a relatively high position by a capillary phenomenon of the liquid absorbing structure, a magnetic force of the magnetic components, and a gravitational force caused by the weight of the main body portion and the weight of the liquid itself in the main body portion, thereby achieving an increase in potential energy. In addition, the liquid potential energy increasing device can achieve an increase in potential energy without using any externally applied force or energy source as described above; therefore, unlike those renewable energy devices using energy source such as solar or wind and required to be implemented outdoors, the liquid potential energy increasing device provided by the embodiments of the invention may be implemented in indoor environments and may be invulnerable to weather and geographical conditions.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
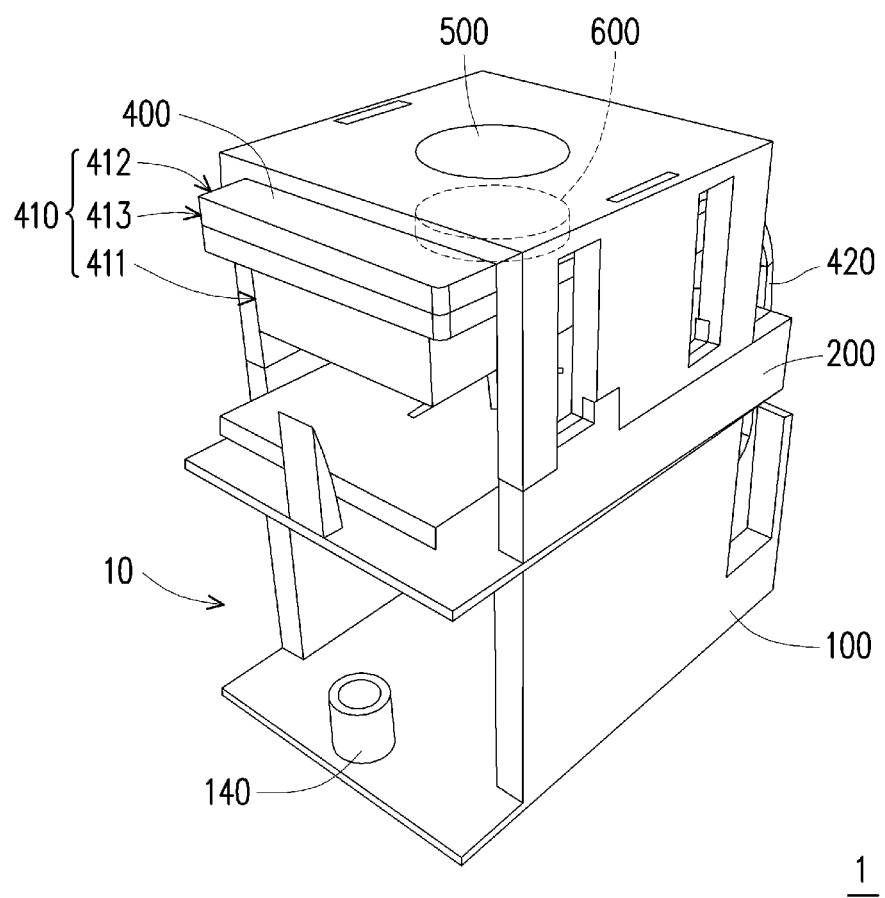
FIG. 1 is a perspective view of a liquid potential energy increasing device according to an embodiment of the invention.
Figure 2:
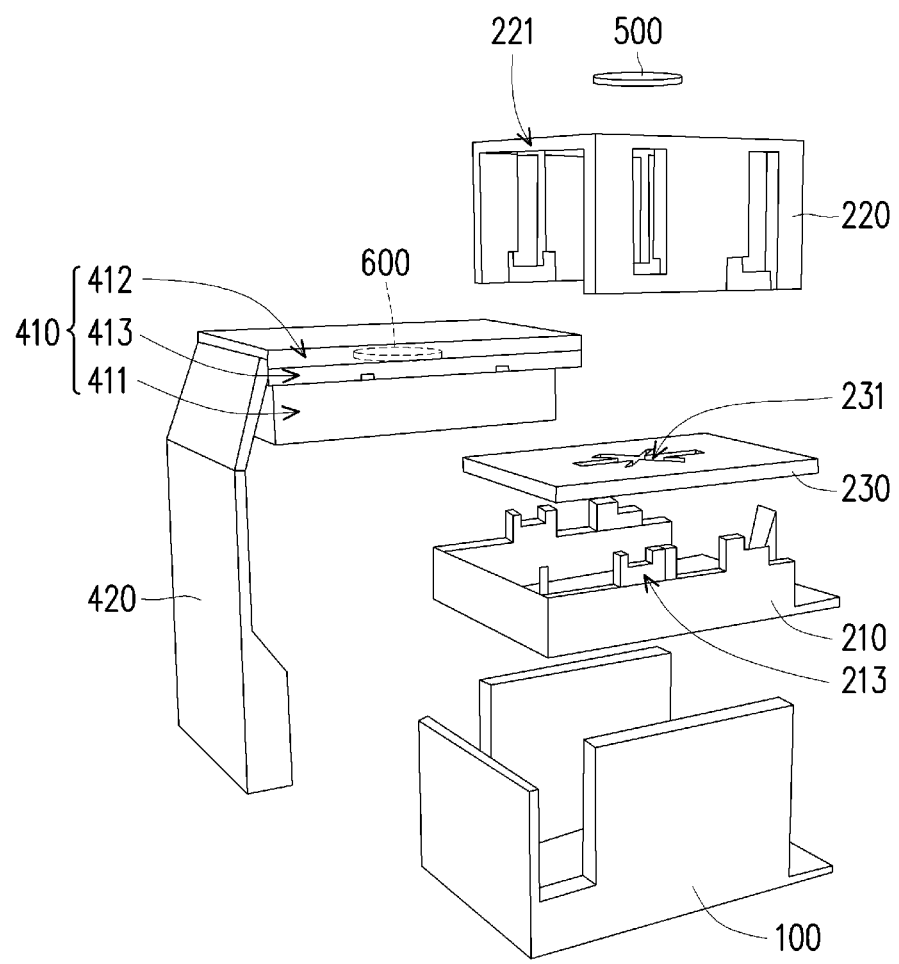
FIG. 2 is an exploded view of the liquid potential energy increasing device illustrated in FIG. 1.

FIG. 1 is a perspective view of a liquid potential energy increasing device according to an embodiment of the invention. FIG. 2 is an exploded view of the liquid potential energy increasing device illustrated in FIG. 1. With reference to FIG. 1 and FIG. 2, a liquid potential energy increasing device 1 of the present embodiment includes at least one potential energy increasing unit 10. The at least one potential energy increasing unit 10 includes a first receiving trough 100, a second receiving trough 200, a liquid absorbing structure 400, a first magnetic component 500, and a second magnetic component 600. The first receiving trough 100 may receive a liquid (e.g., water). The first receiving trough 100 has a drainage hole 140 therein, and the top of the drainage hole 140 has a certain height to discharge excess liquid out of the first receiving trough 100. The second receiving trough 200 is disposed above the first receiving trough 100.

The liquid absorbing structure 400 includes a main body portion 410 and an extending portion 420. The main body portion 410 is located in the second receiving trough 200, and the extending portion 420 is connected to the main body portion 410 and extends to the first receiving trough 100. The first magnetic component 500 and the second magnetic component 600 are disposed on the second receiving trough 200 and the main body portion 410, respectively. The main body portion 410 is positioned at a first position on the second receiving trough 200 by a magnetic attraction between the first magnetic component 500 and the second magnetic component 600.

Figure 3A:
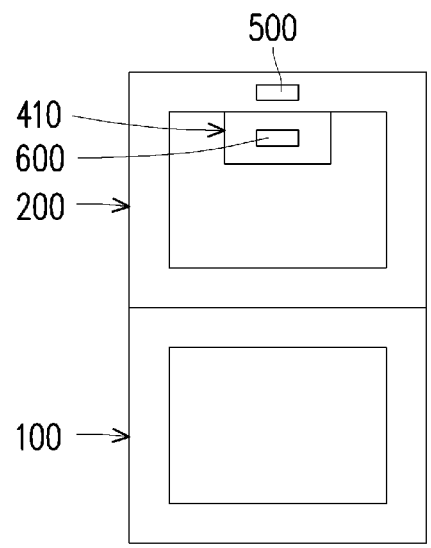
FIG. 3A and FIG. 3B are schematic views of movement of the liquid potential energy increasing device illustrated in FIG. 1.
Figure 3B:
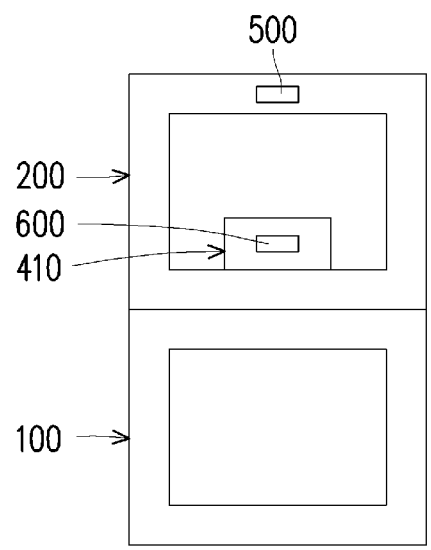

FIG. 3A and FIG. 3B are schematic views of movement of the liquid potential energy increasing device illustrated in FIG. 1. The extending portion 420 of the present embodiment is adapted to convey the liquid in the first receiving trough 100 into the main body portion 410. When a sum of a weight of the main body portion 410 and a weight of the liquid being delivered to the main body portion 410 is greater than the magnetic attractive force, the magnetic attraction is insufficient to keep the main body portion 410 positioned at the first position. Hence, the main body portion 410 moves from the first position shown in FIG. 1 and FIG. 3A to a second position on the second receiving trough 200 as shown in FIG. 3B by gravity, and hits the second receiving trough 200, so that the liquid in the main body portion 410 is at least partially released into the second receiving trough 200. Next, the main body portion 410 is reduced in weight due to partially release of liquid therefrom, and rebounds to the first position via the magnetic attraction. In the present embodiment, the main body portion 410 falls down from the first position shown in FIG. 1 and FIG. 3A to the second position on the second receiving trough 200 shown in FIG. 3B by gravity, but the invention is not limited thereto. In other embodiments, the main body portion 410 may hit the second receiving trough 200 by gravity in a pendulum manner, or may strike the second receiving trough 200 by gravity with other appropriate movements.

As described above, without using any externally applied force or energy source, the liquid in the first receiving trough 100 may be continuously conveyed to the second receiving trough 200 located at a relatively high position by a capillary phenomenon of the liquid absorbing structure 400, a magnetic force of the magnetic components, and a gravitational force caused by the weight of the main body portion 410 and the weight of the liquid itself in the main body portion 410, thereby achieving an increase in potential energy. In addition, the liquid potential energy increasing device 1 can achieve an increase in potential energy without using any externally applied force or energy source as described above; therefore, unlike those renewable energy devices using energy source such as solar or wind and required to be implemented outdoors, the liquid potential energy increasing device 1 of the present embodiment may be implemented in indoor environments and may be invulnerable to weather and geographical conditions.

In the present embodiment, the farer the distance between the first position (as shown in FIG. 1 and FIG. 3A) and the second position (as shown in FIG. 3B), the stronger the force of the main body portion 410 hitting the second receiving trough 200 is. As such, the more liquid may be released from the main body portion 410 to the second receiving trough 200. On the other hand, the magnetic attraction between the first magnetic component 500 and the second magnetic component 600 decreases as the distance between the first position and the second position increases. Hence, the distance between the first position and the second position may be appropriately adjusted according to design requirements. Note that although potential energy is lost as the main body portion 410 moves from the first position to the second position during the aforementioned movements, since the second position is still higher than the first receiving trough, the potential energy of the liquid increases eventually.

Note that the liquid potential energy increasing device 1 of the present embodiment achieves an increase of the liquid's potential energy through the magnetic attractive force, the capillary phenomenon, and the gravitational force as described above, which are means of increasing potential energy and can be implemented according to the invention.

Figure 4:
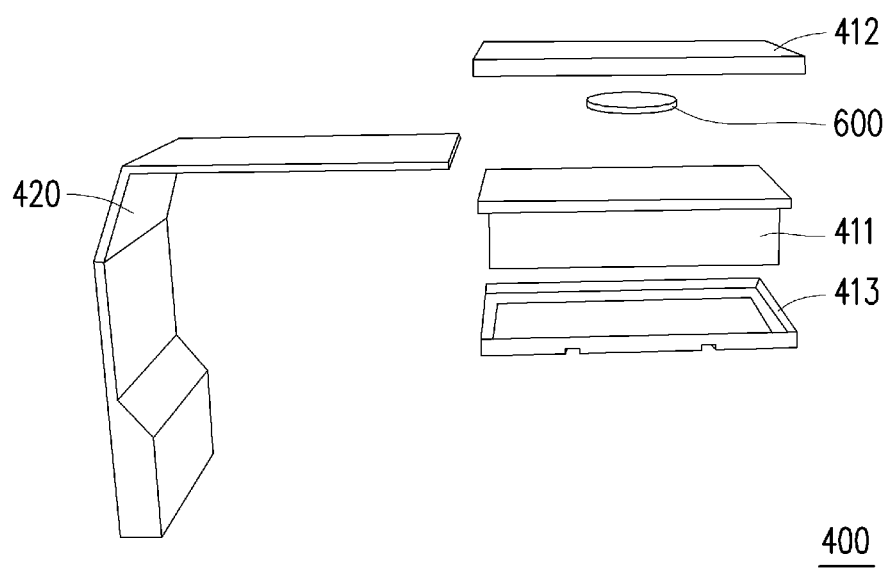
FIG. 4 is an exploded view of the liquid absorbing structure illustrated in FIG. 1.

The following will describe in detail the structure of the liquid absorbing structure 400 of the present embodiment. FIG. 4 is an exploded view of the liquid absorbing structure illustrated in FIG. 1. As shown in FIG. 1, FIG. 2, and FIG. 4, the liquid absorbing structure 400 includes the main body portion 410 and the extending portion 420. The main body portion 410 includes a liquid absorbing component 411, a plate 412, and a frame 413. The extending portion 420 is connected to the liquid absorbing component 411. A periphery of the liquid absorbing component 411 is sandwiched between the plate 412 and the frame 413. The liquid absorbing component 411 protrudes from the frame 413, and the second magnetic component 600 is disposed on the plate 412. In addition, a partial segment of the extending portion 420 of the present embodiment is sandwiched between the plate 412 and the liquid absorbing component 411. The extending portion 420 and the liquid absorbing component 411 may be sponges, and the extending portion 420 and the liquid absorbing component 411 may be an integrally-formed structure. The first magnetic component 500 and the second magnetic component 600 may be magnets. The liquid absorbing structure 400 of the present embodiment may be replaced from the backside of the device. Hence, if maintenance is needed, only the liquid absorbing structure 400 is required to be replaced, thereby allowing convenient replacement and maintenance works.

Figure 5:
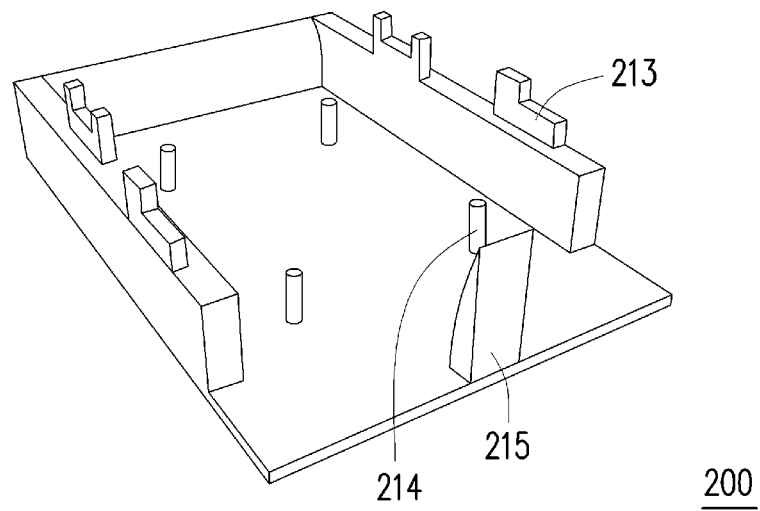
FIG. 5 is a perspective view of a trough body of the second receiving trough illustrated in FIG. 1.
Figure 6:
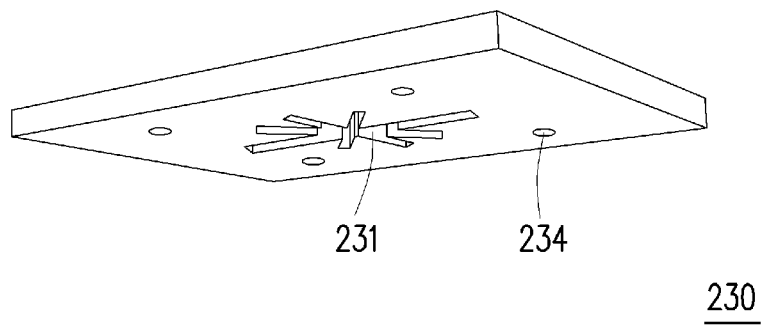
FIG. 6 is a perspective view of an impact plate illustrated in FIG. 1.

The following will describe in detail the structure of the second receiving trough 200 of the present embodiment. FIG. 5 is a perspective view of a trough body of the second receiving trough illustrated in FIG. 1. FIG. 6 is a perspective view of an impact plate illustrated in FIG. 1. As shown in FIG. 2, FIG. 5, and FIG. 6, the second receiving trough 200 of the present embodiment includes a trough body 210, a rack body 220, and an impact plate 230. The trough body 210 is adapted to receive the liquid. The rack body 220 is disposed on the trough body 210 and has a top wall 221, and the first magnetic component 500 is disposed on the top wall 221. The impact plate 230 is disposed inside the trough body 210 and is located at the second position. The impact plate 230 has at least one opening 231 and a plurality of positioning holes 234. When the main body portion 410 hits the impact plate 230 to release the partial liquid in the main body portion 410 onto the impact plate 230, the liquid on the impact plate 230 is adapted to be released into the trough body 210 through the opening 231.

In addition, the trough body 210 further includes a plurality of engaging components 213, and the engaging components 213 are adapted to be engaged with the rack body 220. The second receiving trough 200 further includes a plurality of positioning poles 214 and a baffle 215. The positioning poles 214 may be inserted into the positioning holes 234 of the impact plate 230, so that the impact plate 230 is supported and positioned by the positioning poles 214. The impact plate 230 may be positioned at a fixed position as the baffle 215 is disposed. The first receiving trough 100 and the second receiving trough 200 may be engaged through the engaging components or through other appropriate structures. The impact plate 230 of the present embodiment may be replaced from the backside of the device. Hence, if maintenance is needed, only the impact plate 230 is required to be replaced, thereby allowing convenient replacement and maintenance works.

Figure 7:
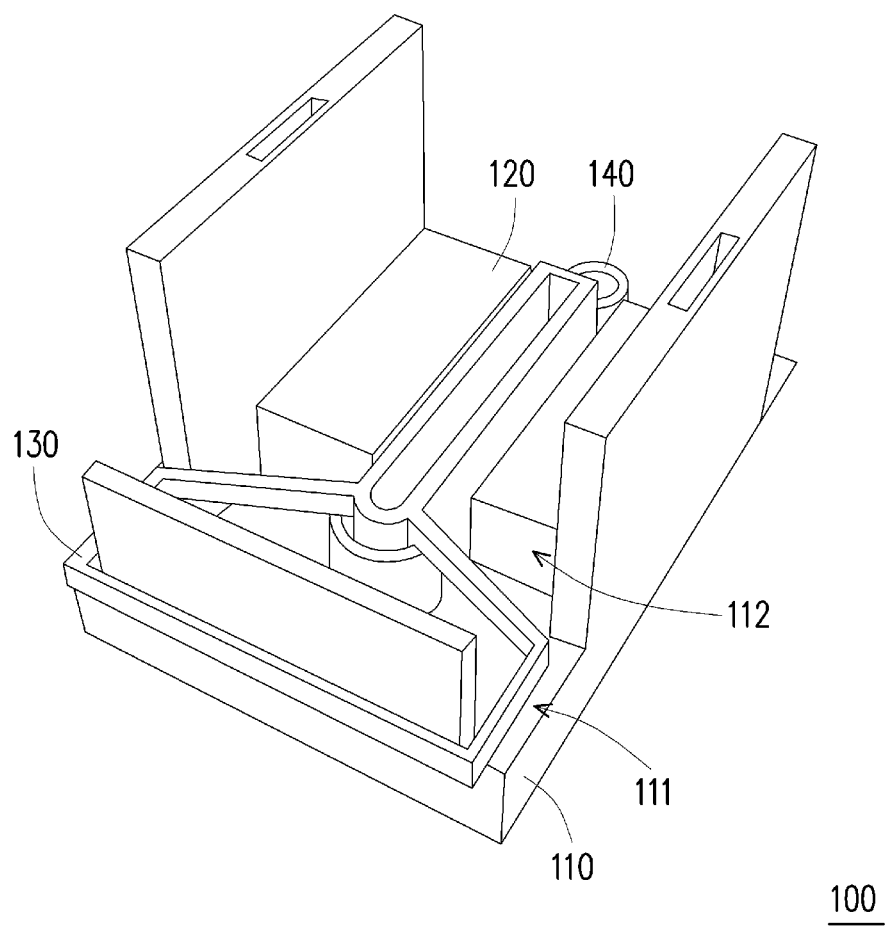
FIG. 7 is a perspective view of the first receiving trough according to another embodiment of the invention.

FIG. 7 is a perspective view of the first receiving trough according to another embodiment of the invention. As shown in FIG. 7, the first receiving trough 100 of the present embodiment includes a float 130. The float 130 is disposed inside the first receiving trough 100 and partially extends outside the first receiving trough 100. A user may determine whether an amount of the liquid in the first receiving trough 100 is normal according to a height of the float 130, so as to ascertain abnormal conditions in the liquid potential energy increasing device 1 relating to malfunction. In addition, the trough body 110 of the first receiving trough 100 is adapted to receive the liquid. The extending portion 420 of the liquid absorbing structure 400 is located at a first region 111 of the trough body 110, and the first receiving trough 100 has at least one protruding portion 120 located at a second region 112 of the trough body 110. By configuring the protruding portion 120, the liquid may be concentrated in the first region 111 where the extending portion 420 is located, so that the liquid potential energy increasing device 1 may operate smoothly using less amount of liquid, thereby achieving the effect of liquid saving.

Figure 8:
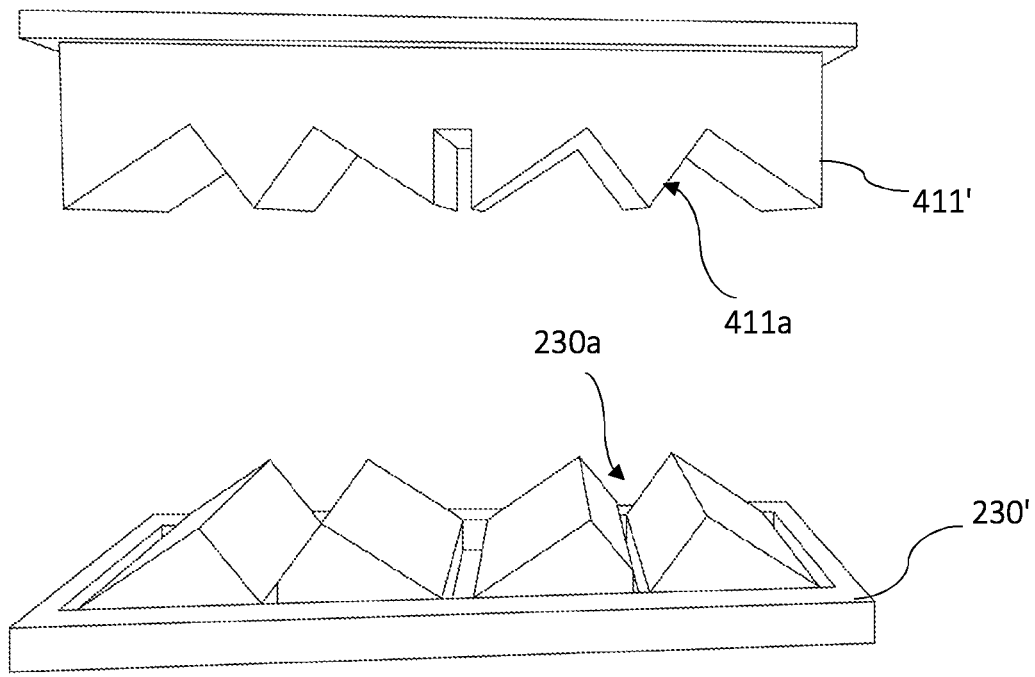
FIG. 8 is a perspective view of a liquid absorbing component and an impact plate according to another embodiment of the invention.
Figure 9:
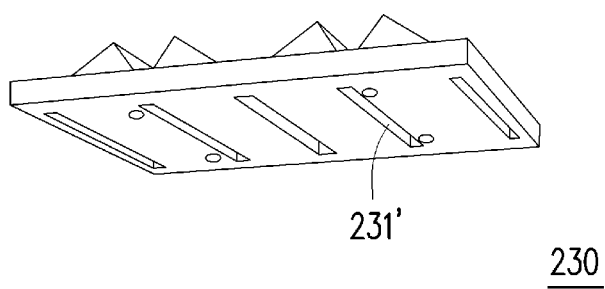
FIG. 9 is a bottom view of the impact plate illustrated in FIG. 8.

FIG. 8 is a perspective view of a liquid absorbing component and an impact plate according to another embodiment of the invention. FIG. 9 is a bottom view of the impact plate illustrated in FIG. 8. With reference to FIG. 8 and FIG. 9, a difference between the present embodiment and the foregoing embodiment includes that a liquid absorbing component 411' of the present embodiment has a plurality of protrusions 411a, and an impact plate 230' has a plurality of recesses 230a. By configuring protrusions 411a and recesses 230a, the impact area where the liquid absorbing component 411' and the impact plate 230' can collide with each other increases, thereby increasing the amount of liquid released after the liquid absorbing component 411' collides. As shown in FIG. 9, the openings 231' of the impact plate 230 may be designed along with a structure of the recesses 230a to fit the structural design of the recesses 230a.

Figure 10:
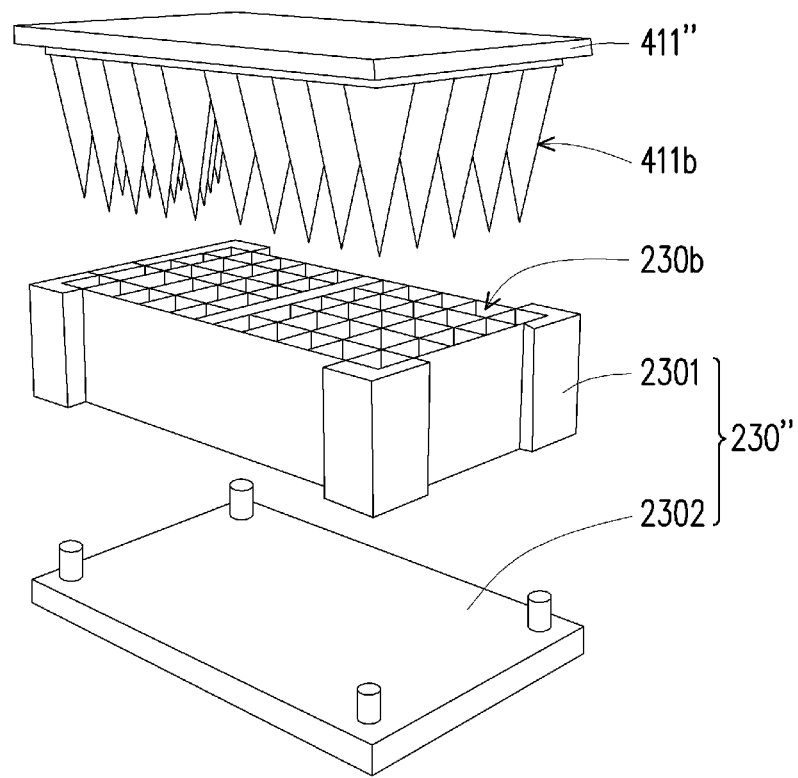
FIG. 10 is a perspective view of a liquid absorbing component and an impact plate according to another embodiment of the invention.

FIG. 10 is a perspective view of a liquid absorbing component and an impact plate according to another embodiment of the invention. With reference to FIG. 10, a difference between the present embodiment and the foregoing embodiment includes that a number of protrusions 411b of a liquid absorbing component 411" and a number of recesses 230b of an impact plate 230" in the present embodiment are more than those shown in FIG. 8 so as to further increase the impact area of the liquid absorbing component 411" and the impact plate 230", thereby adding the amount of liquid released after the liquid absorbing component 411" collides. In addition, the impact plate 230" of the present embodiment includes two components 2301 and 2302, but the invention is not limited thereto. In the present embodiment, a material, a dimension, a structure, a shape (matched with the impact plate), and an elastic modulus of the main body portion 410" may be adjusted and simultaneously modify the foregoing parameters of the impact plate 230" to improve the collision effect.

Figure 11:
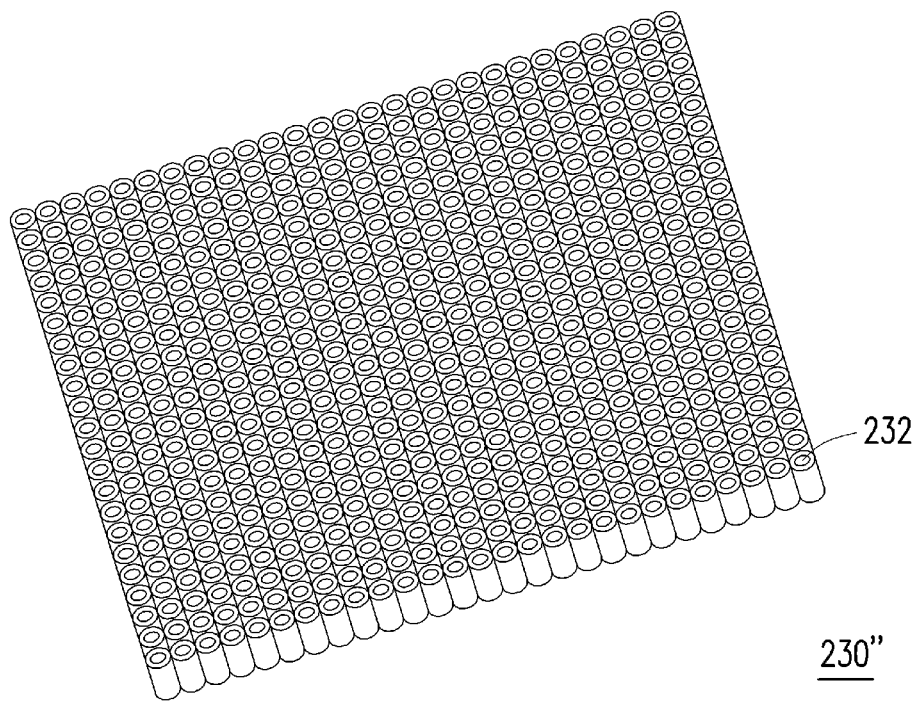
FIG. 11 is a perspective view of an impact plate according to another embodiment of the invention.

FIG. 11 is a perspective view of an impact plate according to another embodiment of the invention. With reference to FIG. 11, a difference between the present embodiment and the foregoing embodiment lies in that an impact plate 230''' of the present embodiment may be composed by a plurality of capillaries 232, thereby allowing a better drainage efficiency.

Figure 12:
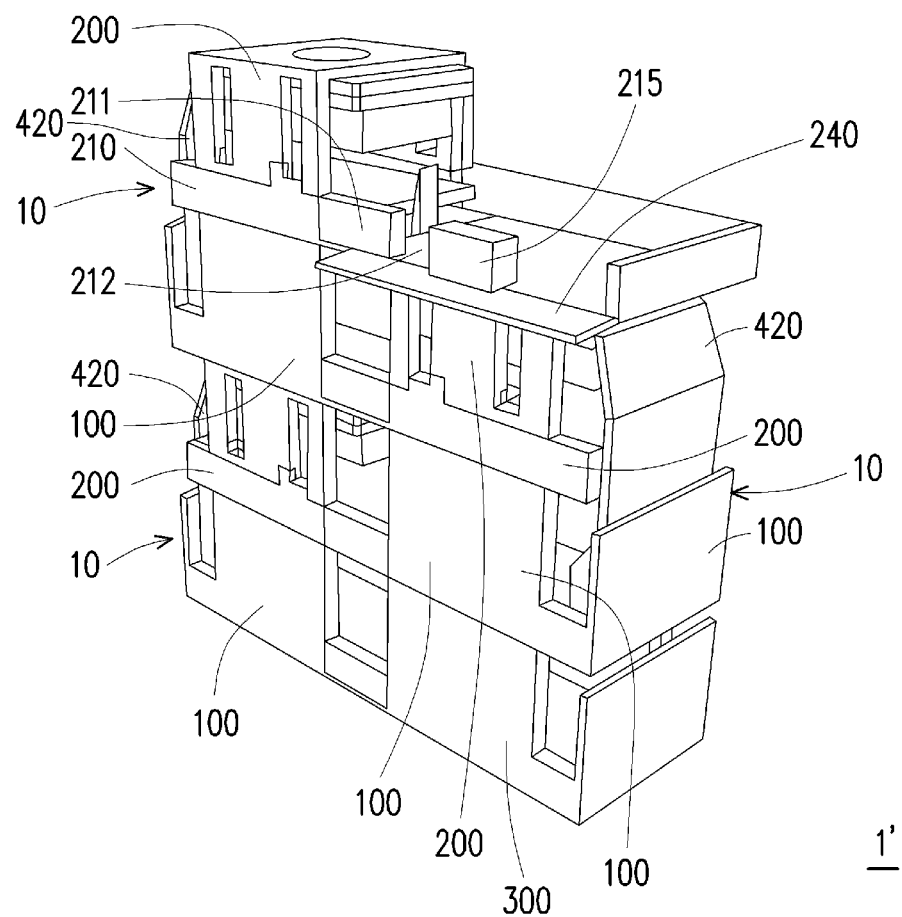
FIG. 12 is a perspective view of a liquid potential energy increasing device according to another embodiment of the invention.

FIG. 12 is a perspective view of a liquid potential energy increasing device according to another embodiment of the invention. With reference to FIG. 12, a liquid potential energy increasing device 1' of the present embodiment has a plurality of potential energy increasing units 10 (shown as three units) and further includes a supporting structure 300. The supporting structure 300 and the first receiving trough 100 of the potential energy increasing unit 10 (illustrated at the lower left side of FIG. 12) are located at a same height. The first receiving trough 100 of the potential energy increasing unit 10 (illustrated at the right side of FIG. 12) is supported on the supporting structure 300, and the first receiving trough 100 of the potential energy increasing unit 10 (illustrated at the right side of FIG. 12) and the second receiving trough 200 of the potential energy increasing unit 10 (illustrated at the lower left side of FIG. 12) are located at a same height and in communication with each other. Similarly, the first receiving trough 100 of the potential energy increasing unit 10 (illustrated at the upper left side of FIG. 12) and the second receiving trough 200 of the potential energy increasing unit 10 (illustrated at the right side of FIG. 12) are located at a same height and in communication with each other. In this way, the potential energy increasing units 10 are alternately stacked with one another in a height direction. As such, the liquid may be delivered to higher positions, thereby obtaining greater potential energy. In other embodiments, other suitable numbers of the potential energy increasing units 10 may be applied, which is not limited thereto.

In the present embodiment, the extending portion 420 of the potential energy increasing unit 10 (illustrated at the lower left side of FIG. 12) and the extending portion 420 of the potential energy increasing unit 10 (illustrated at the right side of FIG. 12) are respectively located at two opposite sides of the liquid potential energy increasing device 1'. Similarly, the extending portion 420 of the potential energy increasing unit 10 (illustrated at the upper left side of FIG. 12) and the extending portion 420 of the potential energy increasing unit 10 (illustrated at the right side of FIG. 12) are respectively located at two opposite sides of the liquid potential energy increasing device 1'.

Figure 13:
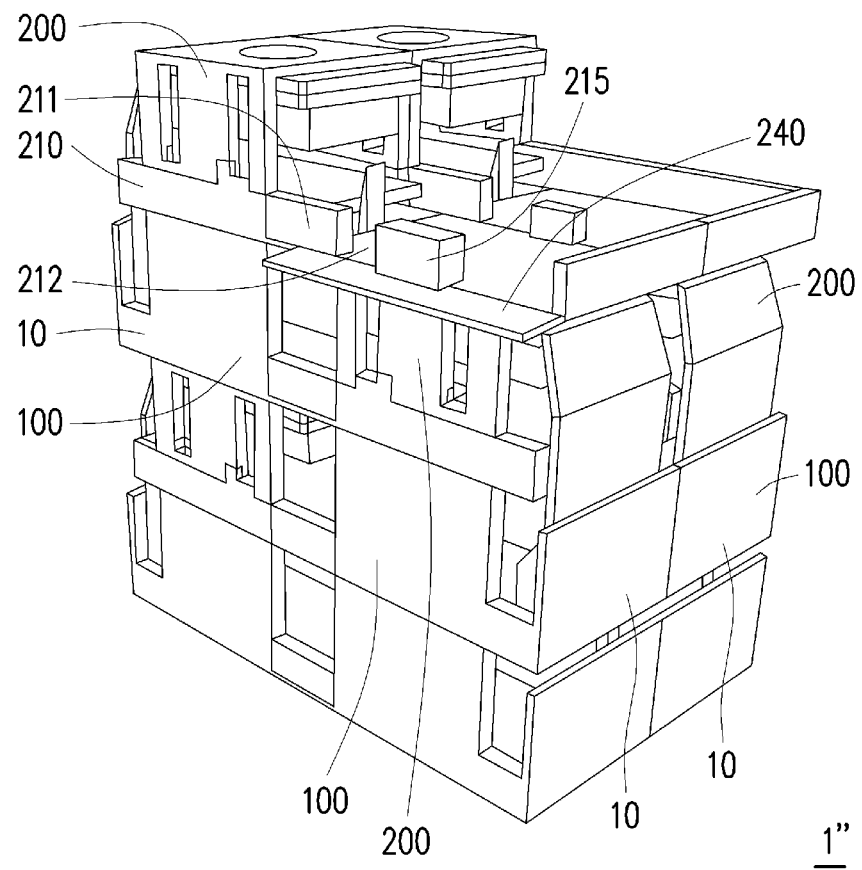
FIG. 13 is a perspective view of a liquid potential energy increasing device according to another embodiment of the invention.

FIG. 13 is a perspective view of a liquid potential energy increasing device according to another embodiment of the invention. As shown in FIG. 13, the potential energy increasing units 10 of a liquid potential energy increasing device 1" of the present embodiment are further connected to one another in a horizontal direction. Specifically, the first receiving trough 100 of each of the potential energy increasing units 10 and the first receiving trough 100 of another one of the potential energy increasing units 10 are located at a same height and in communication with each other. The second receiving trough 200 of each of the potential energy increasing units 10 and the second receiving trough 200 of another one of the potential energy increasing units 10 are located at a same height and in communication with each other. By means of the horizontal connection of multiple potential energy increasing units 10, the amount of liquid accumulated by the liquid potential energy increasing device 1" at higher positions can be increased.

Figure 14:
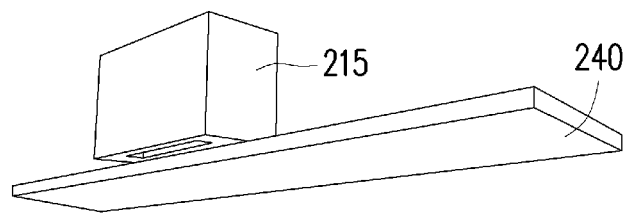
FIG. 14 is a perspective view of a guiding plate illustrated in FIG. 12.

FIG. 14 is a perspective view of a guiding plate illustrated FIG. 12 and FIG. 13. As shown in FIG. 12, FIG. 13 and FIG. 14, in the present embodiment, the second receiving trough 200 at the top of the device includes the trough body 210 and a guiding plate 240. The trough body 210 is adapted to receive the liquid, and a sidewall 211 of the trough body 210 has a notch 212. The guiding plate 240 is adjacent to the notch 212 and is located outside the trough body 210. The liquid inside the trough body 210 is adapted to be discharged along the guiding plate 240 through the notch 212 and to be released from the highest position. For example, the guiding plate 240 of the present embodiment is assembled to the trough body 210 by an assembling portion 215 thereof, but the invention is not limited thereto.

In view of the foregoing, in the liquid potential energy increasing device provided by the embodiments of the invention, the liquid located in the first receiving trough is conveyed upwards to the main body portion in the second receiving trough through the extending portion of the liquid absorbing structure. In this way, after the main body portion absorbs the liquid, the main body portion is heavy enough to move by gravity against the magnetic attraction of the magnetic components and hits the second receiving trough, so that the liquid in the main body portion is partially released into the second receiving trough. Next, the main body portion is reduced in weight due to release of liquid therefrom; thus the main body portion is returned by the magnetic attraction. As described above, without using any force or energy provided by external resources, the liquid in the first receiving trough may be continuously conveyed to the second receiving trough located at a relatively high position by a capillary phenomenon of the liquid absorbing structure, a magnetic force of the magnetic components, and a gravitational force caused by the weight of the main body portion and the weight of the liquid itself in the main body portion, thereby achieving an increase in potential energy. With the use of the embodiments of the invention to increase potential energy of liquid, such potential energy may be further used for other energy conversions such as hydroelectric power generation. Further, the liquid potential energy increasing device provided by the embodiments of the invention improves various disadvantages of the conventional energy generation system. For instance, the liquid potential energy increasing device provided by the embodiments of the invention has advantages over coal-fired and nuclear power facilities, since the liquid potential energy increasing device emits no air pollution and produces no nuclear waste. In addition, the liquid potential energy increasing device can achieve an increase in potential energy without using any externally applied force or energy source as described above; therefore, unlike those renewable energy devices using energy source such as solar or wind and required to be implemented outdoors, the liquid potential energy increasing device provided by the embodiments of the invention may be implemented in an indoor plant and may be invulnerable to weather and geographical conditions. If maintenance is needed, only the corresponding devices such as the liquid absorbing structure or the impact plate is required to be replaced according to the embodiments of the invention, thereby allowing convenient replacement and maintenance works.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A liquid potential energy increasing device, comprising at least one potential energy increasing unit, the at least one potential energy increasing unit comprising:
   a first receiving trough, adapted to receive a liquid;
   a second receiving trough, disposed above the first receiving trough;
   a liquid absorbing structure, comprising a main body portion and an extending portion, wherein the main body portion is located in the second receiving trough, and the extending portion is connected to the main body portion and extends to the first receiving trough; and
   a first magnetic component and a second magnetic component, respectively disposed on the second receiving trough and the main body portion, wherein the main body portion is positioned at a first position on the second receiving trough by a magnetic attraction between the first magnetic component and the second magnetic component, and the extending portion is adapted to convey the liquid in the first receiving trough into the main body portion,
   wherein when a sum of a weight of the main body portion and a weight of the liquid being conveyed into the main body portion is greater than the magnetic attraction, the main body portion moves from the first position to a second position on the second receiving trough by gravity and hits the second receiving trough, so that the liquid in the main body portion is at least partially released into the second receiving trough.

2. The liquid potential energy increasing device as claimed in claim 1, wherein when the liquid in the main body portion is at least partially released into the second receiving trough so that the sum of the weight of the main body portion and the weight of the liquid in the main body portion is less than the magnetic attraction, the main body portion is returned to the first position by the magnetic attraction.

3. The liquid potential energy increasing device as claimed in claim 1, wherein a number of the at least one potential energy increasing unit is plural, and the second receiving trough of at least one of the potential energy increasing units and the first receiving trough of another one of the potential energy increasing units are located at a same height and in communication with each other.

4. The liquid potential energy increasing device as claimed in claim 3, further comprising a supporting structure, wherein the supporting structure and the first receiving trough of one of the potential energy increasing units are located at a same height, the first receiving trough of another one of the potential energy increasing units is supported on the supporting structure, and the extending portion of the at least one potential energy increasing unit and the extending portion of the another one of the potential energy increasing units are respectively located at two opposite sides of the liquid potential energy increasing device.

5. The liquid potential energy increasing device as claimed in claim 1, wherein a number of the at least one potential energy increasing unit is plural, the plurality of the potential energy increasing units are connected to one another in a horizontal direction, the first receiving trough of each of the plurality of the potential energy increasing units and the first receiving trough of another one of the plurality of the potential energy increasing units are located at a same height and in communication with each other, and the second receiving trough of each of the plurality of the potential energy increasing units and the second receiving trough of another one of the plurality of the potential energy increasing units are located at a same height and in communication with each other.

6. The liquid potential energy increasing device as claimed in claim 1, wherein the second receiving trough comprises a trough body and a rack body, the trough body is adapted to receive the liquid, the rack body is disposed on the trough body and has a top wall, and the first magnetic component is disposed on the top wall.

7. The liquid potential energy increasing device as claimed in claim 1, wherein the main body portion comprises a liquid absorbing component, a plate, and a frame, the extending portion is connected to the liquid absorbing component, a periphery of the liquid absorbing component is sandwiched between the plate and the frame, the liquid absorbing component protrudes from the frame, and the second magnetic component is disposed on the plate.

8. The liquid potential energy increasing device as claimed in claim 1, wherein the second receiving trough comprises a trough body and an impact plate, the impact plate is disposed inside the trough body and is located at the second position, the main body portion is adapted to hit the impact plate, and the liquid on the impact plate is adapted to be released into the trough body.

\* \* \* \* \*